Jan. 31, 1939.                J. S. BAKER                2,145,641
                     ZONE CONTROL FOR HEATING SYSTEMS
                         Filed Feb. 11, 1935          6 Sheets-Sheet 1

Inventor
John S. Baker

Jan. 31, 1939.  J. S. BAKER  2,145,641
ZONE CONTROL FOR HEATING SYSTEMS
Filed Feb. 11, 1935   6 Sheets-Sheet 2

Inventor:
John S. Baker,
By Jenks, Addington, Ames & Seibold
Attys.

Jan. 31, 1939.  J. S. BAKER  2,145,641
ZONE CONTROL FOR HEATING SYSTEMS
Filed Feb. 11, 1935  6 Sheets-Sheet 3
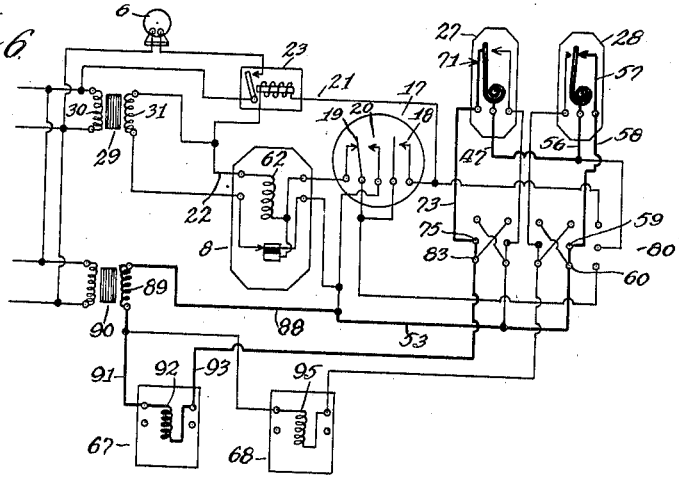
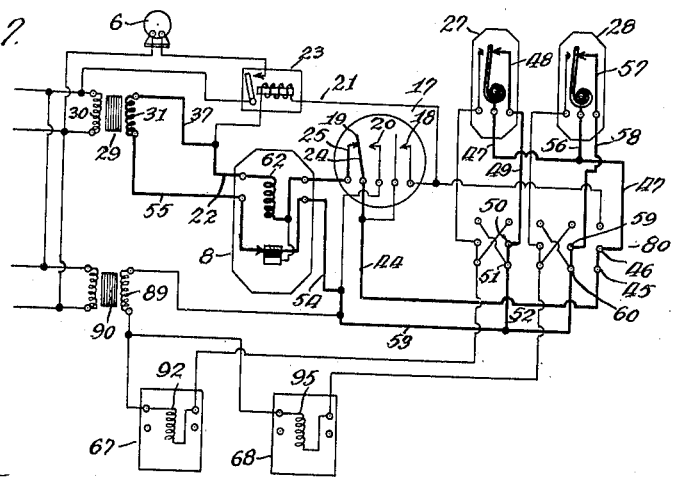
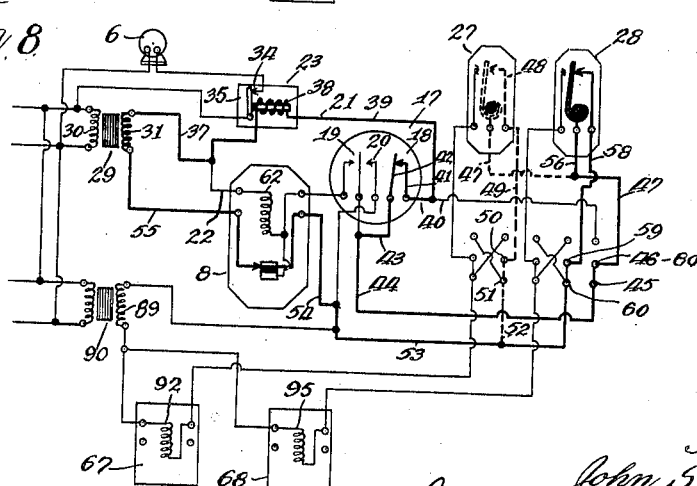
Inventor:
John S. Baker Jan. 31, 1939.    J. S. BAKER    2,145,641
ZONE CONTROL FOR HEATING SYSTEMS
Filed Feb. 11, 1935    6 Sheets-Sheet 5

Inventor:
John S. Baker
By Jones, Addington, Ames & Seibold
Attys.

Patented Jan. 31, 1939

2,145,641

UNITED STATES PATENT OFFICE 2,145,641

ZONE CONTROL FOR HEATING SYSTEMS

John S. Baker, Chicago, Ill., assignor to Cook Electric Company, Chicago, Ill., a corporation of Illinois Application February 11, 1935, Serial No. 5,990

19 Claims. (Cl. 236—1)

This invention relates to temperature regulation and more particularly to a multi-zone control system or apparatus for controlling the temperature of a number of zones or spaces to be heated or to be cooled.

It has been common practice heretofore to regulate the temperature of these zones according to the temperature condition of each zone, such regulation usually being automatic and under the control of a thermostat in each zone. An accepted arrangement has been to close a damper or other mechanism controlling the flow of a heat transfer medium when a predetermined high temperature condition obtains in each zone. Whether the temperature regulation provides for heating the zones in winter or for cooling the zones in summer, further circulation of the medium to the zones ceases when the dampers are closed. It is generally recognized that under these conditions stagnation of the air will follow and a highly undesirable condition will be created in that there will be a tendency for the air in each zone to stratify and create a cold condition. No satisfactory solution has been suggested to overcome this condition, particularly in a multi-zone control, due largely to the intricate character of the control or apparatus necessary in such a system using a single heating plant or a single source of cool air supply for ventilating purposes.

Accordingly, an object of the invention is to provide a multi-zone control for temperature regulating systems adapted to maintain a moderate circulation of the heat conducting medium to each zone although it is satisfied and not calling for heat, and to increase the rate of circulation when one or more zones calls for heat whereby a substantially continuous circulation is obtained at all times in each zone to prevent the air from stratifying and creating a cold condition with a moderate circulation during the time all zones are satisfied, air stratification and resulting cold conditions are obviated, although the heat furnished is not sufficient to modify zone temperatures beyond predetermined thermostat settings.

Specifically, an object of the invention is to provide control apparatus for the purpose described adapted to employ dampers or the like and to maintain these dampers in open position during the period the zone thermostats are satisfied whereby to provide a moderate gravity circulation, and to close the damper of a satisfied zone when another zone is in need of heat whereby through the use of a blower or like circulating means, additional air may be supplied to the unsatisfied zone to restore its predetermined temperature condition. Briefly, the purpose of the present invention is to maintain the dampers open when the zones are satisfied but to close the damper of a satisfied zone when another zone is in need of heat or air conditioning. When all zones are satisfied, all dampers are open, and when all zones are calling for heat or air conditioning, all dampers continue to remain open.

The invention may be advantageously employed in various types of heating systems and need not be limited to hot air systems solely. The invention is generally applicable to hot water, steam, vapor and such other systems employing a circulating medium.

The control apparatus embodying the present invention may be incorporated in various interrelated control circuits adapted to operate the different control devices according to the temperature conditions of the zones. Although the control circuits are fundamentally simple, their operating conditions will vary according to the temperature conditions of the zones, and, if so desirable, according to the temperature conditions of the furnace. The circuit connections remain substantially the same, but, by the operation of a manual device, the furnace may be disconnected and the system used for air conditioning, the heat transfer medium being circulated to maintain the zones at a relatively cool temperature under the control of the room thermostats during the summer.

Other objects and advantages of the invention will be apparent from the following detailed description taken in connection with the accompanying drawings which form a part hereof.

In the drawings:

Figs. 5 and 6 illustrate circuit conditions similar to those shown in Figures 4 and 5 when the room theremostat of zone No. 2 is calling for heat.

Fig. 7 illustrates the circuit connections when the room thermostats of both zones Nos. 1 and 2 are calling for heat, it being noted that in this operation the control does not include the circuit of either one or both of the duct dampers because both duct dampers remain open.

Fig. 8 illustrates the blower relay circuit when the room thermostats of either zones Nos. 1 or 2, or both, are calling for heat.

Figure 12:
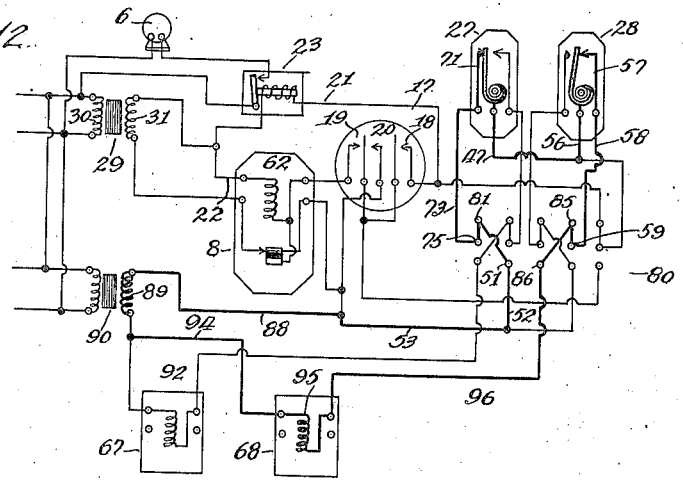

Fig. 12 similarly illustrates the circuit of the duct dampers when the room thermostat of zone No. 1 is actuated to its hot contact and calling for the circulation of a cooling medium.

Figure 13:
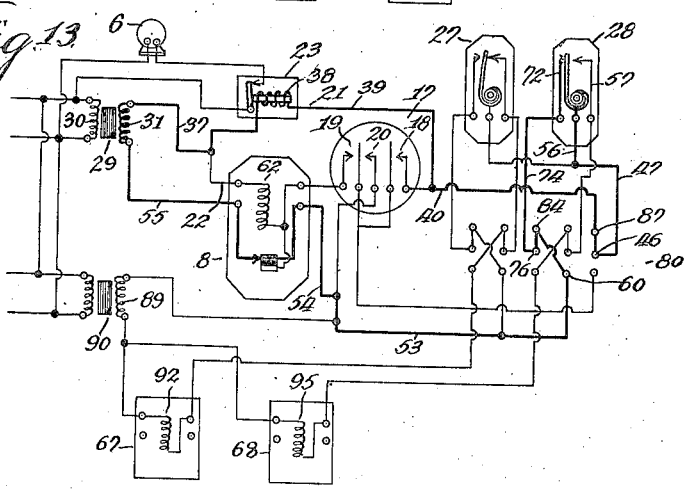

Fig. 13 illustrates the circuit of the blower control when the room thermostat of zone No. 2 is actuated to its hot contact and is calling for the circulation of a cooling medium.

Figure 14:
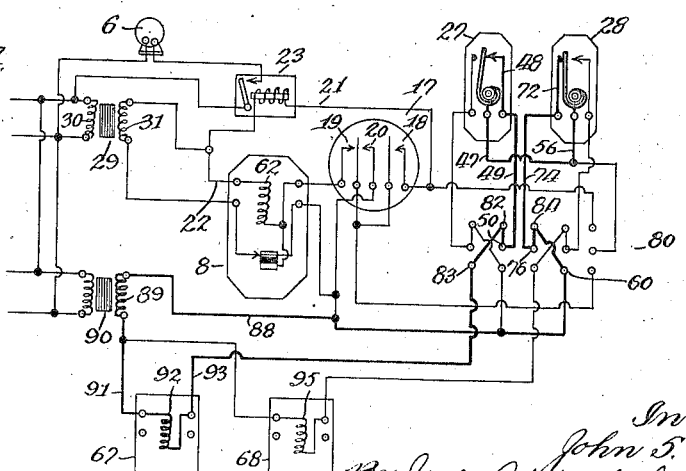

Fig. 14 similarly illustrates the circuit of the duct dampers when the room thermostat of zone No. 2 is actuated and is calling for the circulation of a cooling medium.

Figure 15:
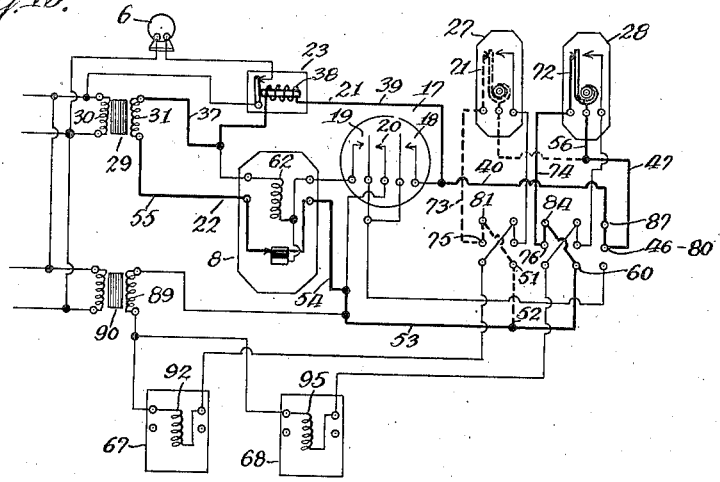

Fig. 15 illustrates the circuit conditions when the thermostats of both zones are actuated to their hot contacts and are calling for the circulation of the cooling medium.

Figure 16:
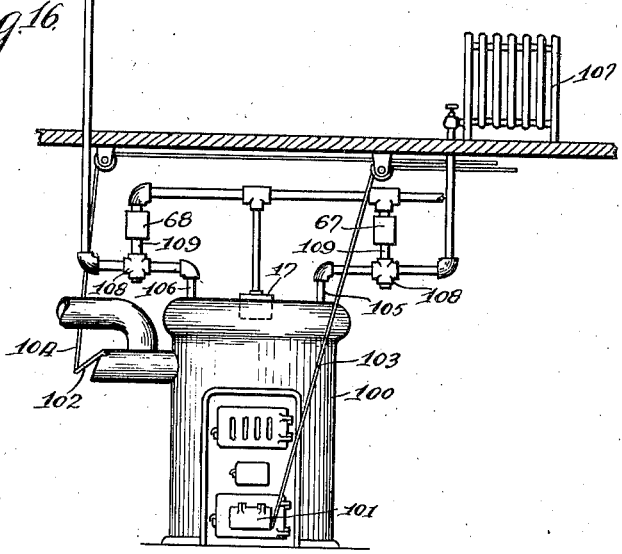

Fig. 16 is a diagrammatic representation of another type of heating system embodying the present invention.

Referring to the drawings, the apparatus shown is merely illustrative of a heating system capable of embodying the invention. The heater or furnace 1 is usually located in the cellar of the house and delivers hot air or other suitable heating medium, such as hot water, steam or vapor to radiators or equivalent structures located at suitable points, say in the rooms of the various floors of a dwelling or building. Furnace 1 may use coal or other solid fuel, or it may use fluid fuel, as oil or gas.

Furnace 1 comprises a fire box 2, a warm air duct 3, forming a bonnet for the furnace, and a plurality of warm air ducts 4 and 5 leading to the different zones or spaces to be heated. In the ordinary dwelling or home, each zone might be a separate apartment, or a separate floor, or it may be separate rooms or spaces in any ordinary type of building. A blower 6 is illustrated as communicating with furnace bonnet 3 by conduit 7.

Figure 1:
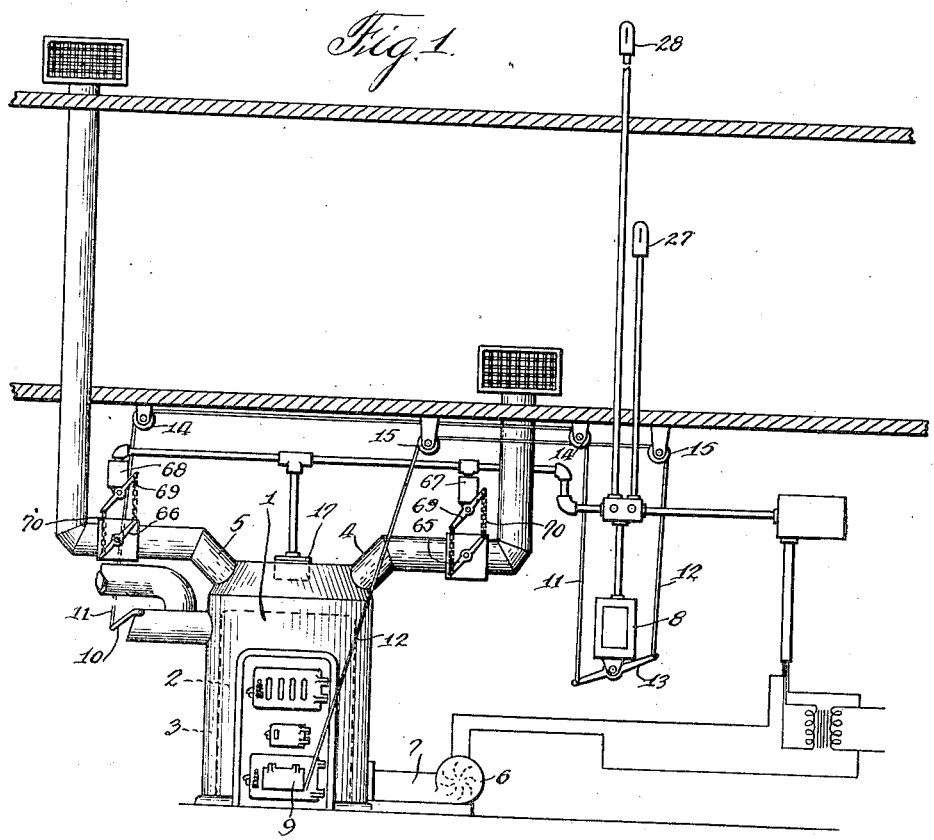
Figure 1 is a diagrammatic representation of a warm air heating system embodying the invention.

Damper controller or other equivalent means 8 may be provided to control the movement or positions of the draft or check dampers 9 and 10 respectively of the furnace, the air supplied by the draft damper 9 in open position passing upwardly through the grate and the fuel to supply the oxygen which supports combustion. The rate of combustion will depend on the air supplied by the draft damper 9 but it will be understood that other means furnishing, say a forced draft, may be employed, or that, in the case of liquid fuel or gas, the rate of combustion may be controlled by controlling the amount of fuel or draft thereto, or both, in an automatically controlled system, including zone or room thermostats 27 and 28 or their equivalent in the different zones or spaces to be conditioned. Figure 1 illustrates room thermostat 27 located in the first apartment or space that may be designated zone No. 1, and room thermostat 28 located in the second apartment or space that is designated zone No. 2.

Electrically operated controller 8 may be of any conventional type, and consequently, it is not believed necessary to describe in detail its construction. It is necessary only that controller 8 be capable of operating dampers 9 and 10 whereby to open draft damper 9 and close check damper 10 when it is desired to provide a forced draft to the fire box to increase combustion and to reverse the position of these dampers when the heat of the furnace or the temperature of the room rises above a predetermined temperature to check the combustion.

Any suitable arrangement of the apparatus may be adopted which, in the case of the showing in Figure 1, includes flexible connections 11 and 12 between the draft and check dampers 9 and 10, and the damper arm 13 of the damper controller 8. Suitable pulleys 14 and 15 may be employed to guide the flexible connections 11 and 12 so that movement of damper lever 13 will operate alternately to open and close the draft and check dampers 9 and 10.

Figure 2:
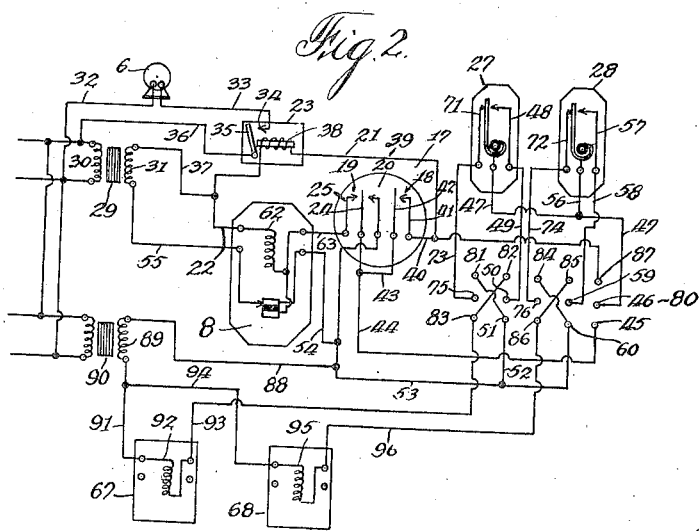
Fig. 2 is a wiring diagram of the control circuit and apparatus.

Bonnet 3 of furnace 1 may be provided with a suitable switch box 17 containing furnace switches 18, 19 and 20. Each of the switches 18 and 19 is provided with a control circuit 21 and 22, respectively (Fig. 2). A relay 23 is provided in control circuit 21 to effect closing of the circuit of the motor driven blower 6 when the temperature of the furnace exceeds a predetermined degree. When this temperature is reached, contact 41 will engage contact 42 of furnace switch 18. Contacts 24 and 25 of switch 19 are included in control circuit 22 and are adapted to close to energize damper controller 8 upon a predetermined drop of furnace temperature. Switch 20 is normally inactive, but functions as a safety element to connect both control circuits 21 and 22 in series relation, to operate blower 6, irrespective of all other conditions of the system, when the furnace temperature is excessive, this operation being later explained in connection with Fig. 10. On the other hand, room thermostats are in control circuit 22, having furnace switch 19 therein.

Any suitable source of current supply may be used. A transformer 29, having a primary coil 30 and a secondary coil 31, is shown, the arrangement being to allow the circuit of the motor driven blower 6 to connect to the primary side of transformers 29. If desired, the secondary coil 31 may be used to supply current to control circuits 21 and 22.

Specifically, the circuit of the motor driven blower 6 includes wire 32, motor driven blower 6, wire 33, contact 34, armature 35 of relay 23, and wire 36 connecting to the return side of the power mains. Control circuit 21 includes wire 37, coil 38 of relay 23, wire 39, wire 40, contacts 41 and 42 of furnace switch 18, wire 43, wire 44, contact 45, across to contact 46, wire 47, and, if thermostat 27 of zone No. 1 is actuated, through the bimetallic element of this thermostat 27 to cold contact 48, wire 49, contact 50 across to contact 51, wire 52, wire 53, wire 54, through controller 8 depending upon its type, and return by wire 55 to secondary coil 31 of transformer 29. If thermostat 28 of zone No. 2 is actuated instead of thermostat 27 of zone No. 1, or, if both of these thermostats 27 and 28 are actuated, the current will flow from wire 47 to wire 56, through the bimetallic element and the cold contact 57 of this thermostat 28, wire 58, contact 59, across to contact 60, through wire 53, wire 54, through controller 8 under the same conditions as aforesaid, and by return wire 55 to the secondary coil 31 of transformer 29. In other words, wire 53 serves as a common return for both contacts 51 and 60 of the individual circuits of each thermostat 27 and 28, while wire 47 is likewise common to the opposite side of each of these individual thermostatic control circuits through contacts 45 and 46 and the wire 44.

More specifically the circuit of thermostat 27 of zone No. 1 comprises contacts 45 and 46, wire 47, the thermostatic element and cold contact 48 of this thermostat, wire 49, contacts 50 and 51 and wire 52. The circuit of thermostat 28 of zone No. 2 comprises contacts 45 and 46, wire 47, wire 56, the thermostatic element and cold contact 57 of this thermostat, wire 58, contacts 59 and 60 to which this common wire 53 connects.

Control circuit 22 includes wire 37, the actuating coil 62 of controller 8, wire 63 connecting to contact 25 of furnace switch 19, contact 24, wire 44, contact 45 across to contact 46, wire 47 through either of the zone thermostats 27 or 28, as above described, returning by either wire 49 or wire 58 and connecting to the common wire 53, wire 54, and by return wire 55 to secondary coil 31 of transformer 29.

If the furnace 1 is of the hot air type, it will be provided with the warm air ducts 4 and 5 leading to the different zones or spaces to be heated and having damper valves or dampers 65 and 66, respectively. However, if furnace 1 is of the hot water, steam, vapor or the like type, these valves 65 and 66 will, in a like manner, control the flow of the heat conducting medium to the different zones or spaces to be heated. Auxiliary damper controllers 67 and 68, which may be electrically operated, are connected in circuit to operate these duct dampers 65 and 66. These auxiliary controllers 67 and 68 may be of any conventional type, and consequently, it is not believed necessary to describe them in detail. As in the case of the electrically operated controller 8, it is necessary only that these controllers 67 and 68 be capable of operating duct dampers 65 and 66 to open and close the same, as the case may be, when their circuits are energized. Each auxiliary controller may be provided with a damper arm 69, having flexible connections 70 extending to opposite ends of an external arm mounted upon the pivot of the duct dampers 65 and 66. It will be understood that the manner in which these auxiliary controllers are connected to operate the duct dampers 65 and 66, as well as their construction and operation, may be varied somewhat, the purpose being to open and close the duct dampers by the operation of the auxiliary controllers.

Thermostats 27 and 28 are provided with hot contacts 71 and 72, respectively, which are connected by means of wires 73 and 74 to contacts 75 and 76. As previously explained, the cold contacts 48 and 57 of these thermostats are connected, respectively, to contacts 50 and 59. These contacts are a part of a number of contacts forming a winter and summer switch 80 which may be operated either to connect or disconnect the furnace controls comprising the furnace switches 18, 19 and 20 and the damper controller 8, whereby the system may be used for heating purposes in the winter or may be used for cooling purposes in the summer. This winter and summer switch 80 comprises additional contacts 81, 82 and 83 in the hot and cold side of room thermostat 27, and the additional contacts 84, 85 and 86 in the hot and cold side of room thermostat 28. Wire 40 leads to additional contact 87 of the summer and winter switch 80. The operation and function of these contacts of the summer and winter switch 80 will be explained hereinafter in connection with the various circuits showing the different operating conditions of the system. Duct damper controllers 67 and 68 are connected in circuits leading to contacts 83, 51, 86 and 60 of summer and winter switch 80. The circuit of duct damper controller 67 includes, say contact 51, wire 52, wire 53, wire 88, a secondary coil 89 of transformer 90, a wire 91, coil 92 of duct damper controller 67, a wire 93 connecting to contact 83. The circuit of duct damper controller 68 may include contact 60, wire 53, wire 88, secondary coil 89 of transformer 90, a wire 94, the coil 95 of controller 68, and a wire 96 connecting to contact 86.

The various circuit conditions effecting operation of the duct dampers 67 and 68 to hold them in open position during the period the room thermostats 72 and 82 are satisfied, whereby to provide a moderate gravity circulation of the heat conducting medium, and to close either one of these dampers if the corresponding zone is satisfied and the other zone is calling for heat, will now be described in connection with the different figures of the drawings illustrating these various circuit conditions. The circuit for a given condition is shown in heavy lines while the other connections that are inactive at the time are shown in light lines.

Figure 3:
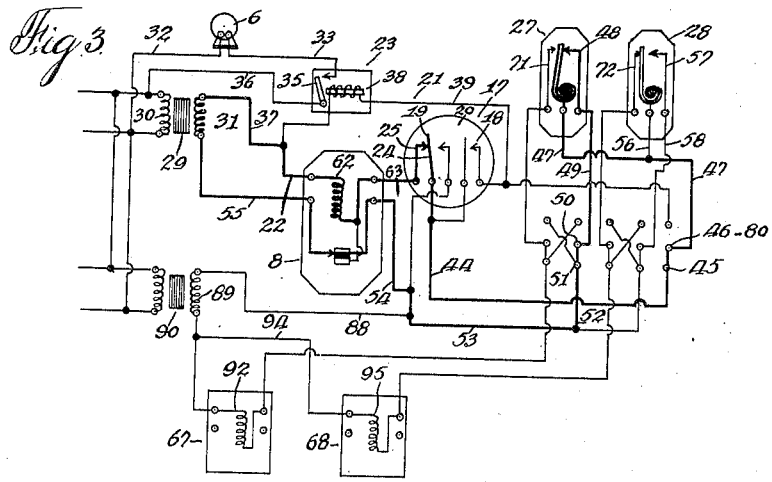
Fig. 3 is a similar view but illustrating the circuit of the furnace control when the room thermostat of zone No. 1 is calling for heat.
Figure 4:
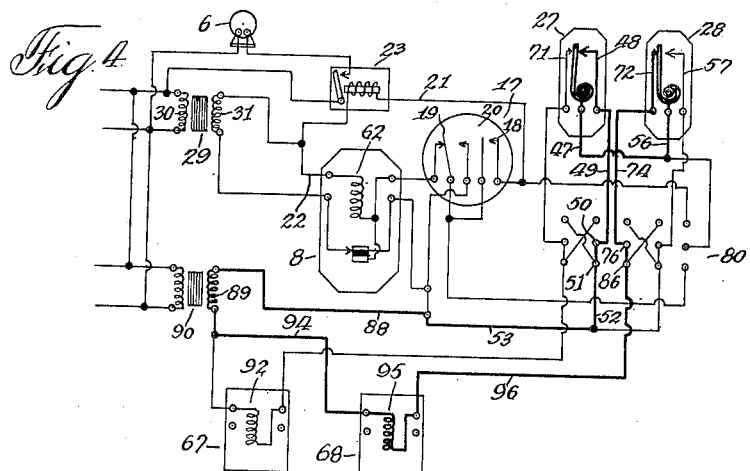
Fig. 4 is a similar view illustrating the circuit controlling the duct dampers when the room thermostat of zone No. 1 is calling for heat.

Figures 3 and 4 illustrate the flow of current at a time when thermostat 27 of zone No. 1 calls for heat while thermostat 28 of zone No. 2 remains satisfied. In this condition the circuit is closed across the cold contact 48 of thermostat 27, and, if the furnace is at a predetermined low temperature, switch 19 will close to energize furnace controller 8 and thereby increase the rate of combustion to raise the furnace temperature. Upon a predetermined increase of furnace temperature, furnace switch 18 will close and energize the relay circuit operating the circuit of the blower motor. Irrespective of these conditions, the closing of the circuit of thermostat 27 at its cold contact will energize duct damper controller 68 to close duct damper 66 and thereby prevent a circulation of the heat conducting medium to zone No. 2 when blower 6 operates. Duct damper 65 remains open so that the forced circulation of the heat conducting medium established by the operation of blower 6 will supply the heating medium at an accelerated rate to zone No. 1 to restore its temperature conditions and to again open its room thermostat 27 at its cold contact.

Figure 5:
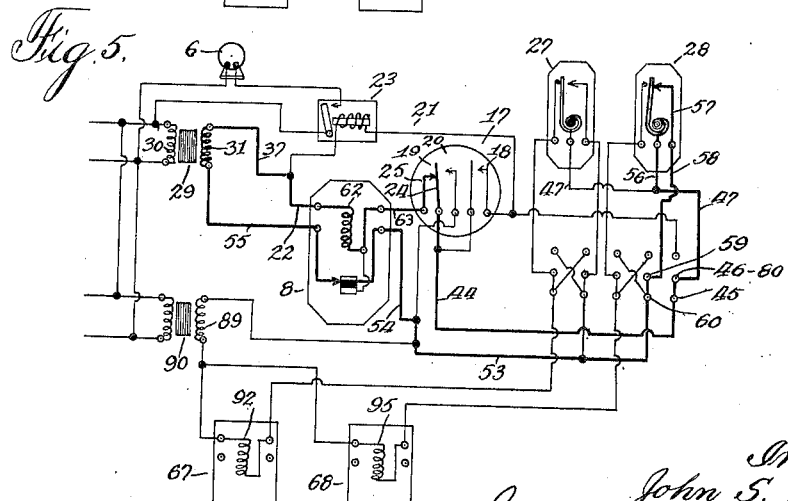

Figures 5 and 6 illustrate the circuit conditions when thermostat 28 of zone No. 2 calls for heat and the thermostat 27 of zone No. 1 remains satisfied. Whether furnace controller 8 is energized to increase the rate of combustion at the furnace will depend upon the temperature of the furnace when this condition occurs. However, duct damper controller 67 will be energized to close duct damper 65, the duct damper controller 68 remaining deenergized and its duct damper 66 remaining open. The operation of blower 6 in this condition will effect a forced circulation of the heat conducting medium to zone No. 2 to restore its temperature and satisfy its room thermostat 28.

Figure 7 illustrates the circuit condition when thermostats 27 and 28 of both zones Nos. 1 and 2 call for heat. Neither of the duct damper controllers 67 or 68 is energized, and consequently both duct dampers 65 and 66 remain open so that the operation of blower 6 may provide a forced circulation of the heat conducting medium to both zones Nos. 1 and 2 to restore their temperature conditions and satisfy their thermostats 27 and 28.

Figure 9:
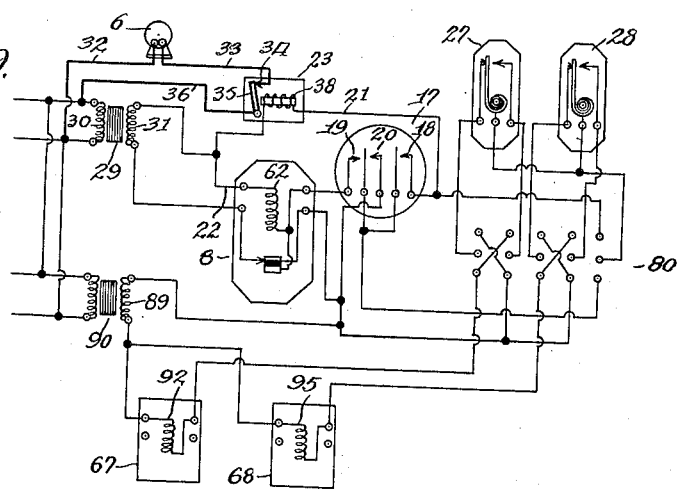
Fig. 9 illustrates the blower circuit as it exists under all conditions of operation.
Figure 10:
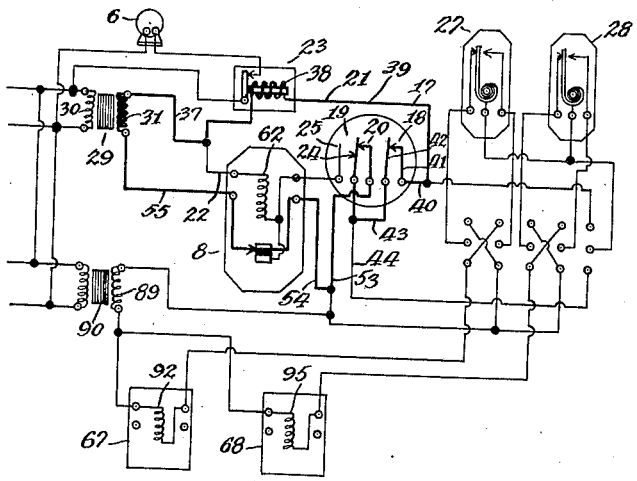
Fig. 10 illustrates the operating circuit of the furnace control when the furnace temperature is excessive, independently of all other conditions.

Figure 8 illustrates the relay circuit of the blower 6 when either zones No. 1 or No. 2, or both, call for heat. Figure 9 illustrates the blower circuit energized. Figure 10 illustrates a condition known as "safety" independently of the condition of the control apparatus. The blower 6 will operate to establish a forced circulation of air through the bonnet 3 of furnace 1 when the temperature of the furnace is excessive and it is advisable to cool or lower the temperature of the furnace by the cooling effects of the air being circulated by blower 6 through bonnet 3. As the circuit is shown in Fig. 10, both duct dampers 65 and 66 will be open to allow the forced circulation of the heating medium at this time to pass to both zones.

Figure 11:
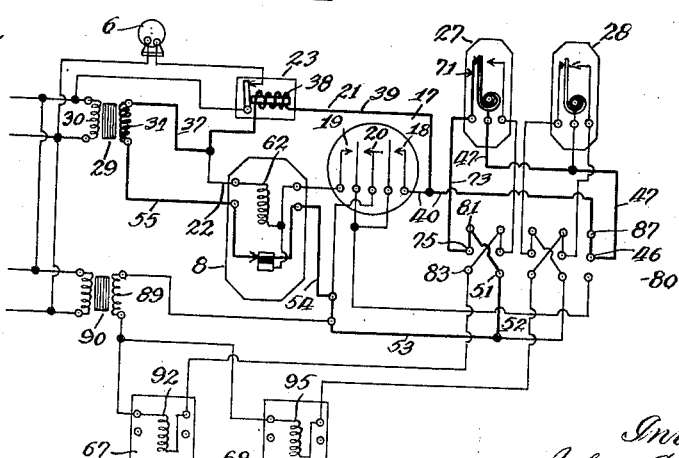
Fig. 11 illustrates the circuit of the blower control when the winter switch is opened and the summer switch is closed, and the room thermostat of zone No. 1 is actuated to its hot contact and calling for the circulation of a cooling medium.

Figures 11 to 14, inclusive, illustrate the circuit conditions when the winter and summer switch 80 is operated to open the winter connections and to close the summer connections, and when zone No. 1 or zone No. 2, or both, are at a predetermined high temperature and their thermostats actuated to effect operation of blower 6 and a forced circulation of a cooling medium to these zones. Figures 11 and 12 illustrate a condition of the circuit when thermostat 27 of zone No. 1 is actuated to operate blower 6. The furnace controls, including the furnace damper and the furnace controller 8 and the furnace switches 18, 19 and 20, are disconnected from the circuit at the winter and summer switch 80. The relay circuit of blower 6 will be energized to close the circuit of this blower while duct damper controller 68 will be energized to close duct damper 66 of zone No. 2. Figures 13 and 14 illustrate a summer condition of the circuit when thermostat 28 of zone No. 2 is energized to effect operation of blower 6 for circulation of the cooling medium to zone No. 2. Again, when the aforesaid furnace controls are disconnected from the circuit, the relay circuit of blower 6 is energized to close the circuit of this blower while duct damper controller 67 is energized to close duct damper 65 of zone No. 1. Figure 15 illustrates a summer condition of the circuit when both zones Nos. 1 and 2 simultaneously call for a forced circulation of the cooling medium and their thermostats 27 and 28 are energized to close the relay circuit of blower 6, the circuit of blower 6 thereby being closed to operate this blower 6.

For a more complete understanding of these various circuits under the conditions above described, I shall now describe the manner in which the current flows through these circuits under each of these conditions. Referring specifically to Figures 3 and 4 illustrating a winter condition when the temperature of zone No. 1 drops and its thermostat 27 calls for heat, the thermostatic element of this thermostat engages cold contact 48. The circuit thus established for closing duct damper 66 of zone No. 2 includes cold contact 48, wire 49, contacts 50 and 51 of winter and summer switch 80, wire 52, wire 53, wire 88, secondary coil 89 of transformer 90, wire 94, actuating coil 95 of duct damper controller 68, wire 96, contacts 86 and 76 of this winter and summer switch 80, wire 74, hot contact 72 and thermostatic element of thermostat 28 of zone No. 2, wire 56 connecting to wire 47. Accordingly, duct damper 66 of zone No. 2 is closed and duct damper 65 of zone No. 1 remains open. If the furnace is at a temperature too low to warrant a forced circulation of the heat conducting medium without chilling zone No. 1, furnace switch 19 will be closed and furnace controller 8 connected in circuit to increase the rate of combustion at the furnace. For this condition, the current will flow through a circuit comprising, say, wire 37, actuating coil 62 of furnace controller 8, wire 63 across contacts 25 and 24 of furnace switch 19, wire 44 across contacts 45 and 46 of the winter and summer switch 80, wire 47, the thermostatic element and the cold contact 48 of thermostat 27 of zone No. 1, wire 49 across contacts 50 and 51, wire 52, wire 53, wire 54 and return by wire 55 to secondary coil 31 of transformer 29. As soon as the temperature of the furnace is raised to a predetermined point, furnace switch 18 is closed to establish the relay circuit of blower 6.

By referring to Figure 8 it will be noticed that relay circuit of blower 6 includes, say, wire 37, coil 38 of relay 23, wire 39, wire 40, the contacts 41 and 42 of furnace switch 18, wire 43, wire 44 across contacts 45 and 46, wire 47, the thermostatic element and cold contact 48 of thermostat 27 of zone No. 1, wire 49 across contacts 50 and 51, wire 52, wire 53, wire 54 and return by wire 55 to secondary coil 31 of transformer 29. The flow of current through relay coil 38 will energize relay 23 and attract armature 35 into closing position against contact 34.

Figure 9 illustrates the flow of current through the blower circuit which is thereby established. This blower circuit includes wire 32, blower 6, wire 33, contact 34, armature 35 and a return by wire 36 to the other side of the line.

Likewise, when zone No. 2 calls for heat and its thermostat 28 is actuated, two circuits may be established, and, if the temperature of the furnace is below a predetermined degree, a third circuit will be established to operate damper controller to accelerate the rate of combustion. One of these circuits will include auxiliary damper controller 67 operating duct damper 65, which controls the flow of the heat conducting medium to zone No. 1, and both zone thermostats 27 and 28. The second circuit will include the relay circuit of the blower 6 and the furnace switch 18 which operates to establish this circuit when the temperature of the furnace rises to a predetermined degree warranting a forced circulation of the heat conducting medium to zone No. 1. The flow of current through the first circuit may be traced from the thermostatic element and cold contact 57 of thermostat 28 through wire 58, contacts 59 and 60 of the winter and summer switch 80, wire 53, wire 88, the secondary coil 89 of transformer 90, wire 91, the actuating coil 92 of duct damper controller 67, wire 93, contacts 83 and 75, wire 73, hot contact 71 and thermostatic element of thermostat 27 of zone No. 2, wire 47 to wire 56 connecting to the thermostatic element of thermostat 28. Again, if the furnace is at a predetermined high temperature, the furnace controller 8 will not be energized to increase the rate of combustion at the furnace, but, if the furnace is at a low temperature, the current will flow from the thermostatic element and cold contact 57 of room thermostat 28, wire 58, contacts 59 and 60, wire 53, wire 54, wire 55, secondary coil 31 of transformer 29, wire 37, actuating coil 62 of furnace controller 8, wire 63, contacts 25 and 24 of furnace switch 19, wire 44, contacts 45 and 46, wire 47 and wire 56 connecting to said thermostatic element of thermostat 28. The relay circuit of blower 6 is substantially the same as described in connection with Figures 3 and 4 when zone No. 1 calls for heat instead of zone No. 2, the current, however, flowing from wire 47 to wire 56 connecting to the thermostatic element of thermostat 28, cold contact 57 and return by wire 58 across contacts 59 and 60 to wire 53, this being shown in Figure 8 and described substantially as aforesaid. The current flowing through relay circuit of blower 6 will close the circuit of blower 6, also in the same manner as before described in connection with Figure 9. Whether furnace controller 8 is energized, the relay circuit just described will operate to energize the blower circuit and operate blower 6 to establish a forced circulation of the heating medium through the open duct damper 66 to zone No. 2 and restore the temperature conditions therein. When the temperature condition of zone No. 2 is restored, its thermostat 28 will be satisfied and the circuit connections just described broken to again open duct damper 65 to zone No. 1, whereby to permit a gravity circulation of the heat conducting medium thereto.

Figure 7 illustrates the flow of current when the temperature drops and both zones call for heat. Inasmuch as both duct dampers 65 and 66 are open, the circuits, including the auxiliary duct damper controllers 67 and 68, will not be energized. Whether the furnace controller 8 is energized again depends upon the temperature of the furnace. If the furnace is at a predetermined low temperature which requires increased combustion to heat the heat conducting medium before being forced to both zones, the current will flow, say, from secondary coil 31 of transformer 29, wire 37, actuating coil 62 of furnace controller 8, wire 63, contacts 25 and 24 of furnace switch 19, wire 44, contacts 45 and 46 of the winter and summer switch 80, wire 47 from where it will first flow through wire 56, the thermostatic element and cold contact 57 of thermostat 28, wire 58, contacts 59 and 60 to wire 53, and also from wire 47 to the thermostatic element and cold contact 48 of thermostat 27, wire 49, contacts 50 and 51 and wire 52 to the return wire 53, wire 54, wire 55 and then to secondary coil 31 of transformer 29. As soon as the furnace reaches a predetermined high temperature, the current will flow, as shown in Figure 8 and as previously described, from secondary coil 31, wire 37, coil 38 of relay 23, wire 39, wire 40, contacts 41 and 42 of furnace switch 18 to wire 43 and wire 44, from where the current will flow through both thermostats 27 and 28, as described in connection with Figure 7 and return, as therein shown, to the secondary coil 31 of transformer 29.

A rather simple circuit condition, as shown in Fig. 10, is established when the temperature of the furnace becomes excessive. The contact of furnace switch 20, which is otherwise inactive, operates to engage contact 24 of furnace switch 19 and establishes a safety circuit, independently of the temperature of either or both zones. The safety condition may be established, therefore, independently of zone temperature conditions and be responsive to furnace temperature conditions solely so that the possibility of the furnace overheating may be minimized by circulating cool air through the bonnet 3 when the temperature becomes excessive for normal operation. This safety circuit is substantially the same as that normally established by the blower relay circuit shown in Figure 8 except for cutting out the room thermostats and the engagement of the contact of furnace switch 20 with contact 24 so that the current will continue to flow from furnace switch 18 through contact 20 and contact 24, a portion of wire 53, and to wire 54, wire 55, the secondary coil 31 of transformer 29, wire 37, coil 38 of relay 23, and wires 39 and 40 to furnace switch 18. Relay 23 is thereby energized to close the blower circuit.

When the summer and winter switch 80 is operated to convert the system into a cooling or ventilating system, furnace controls 8 and 17 may be disconnected. The blower relay circuit will be substantially the same as when the system is used for heating. However, instead of the zone thermostats 27 and 28 closing at their cold contacts, they will close at their hot contacts when energized to establish a forced circulation of the cooling medium to the zones. When zone No. 1 calls for a forced circulation of the cooling medium, which condition is illustrated in Figures 11 and 12, the blower relay circuit comprises wire 37, coil 38 of relay 23, wires 39 and 40, contacts 87 and 46, wire 47, through the thermostatic element of thermostat 27 to hot contact 71, wire 73, contact 75, contact 81 across the bridging element of the summer and winter switch 80 to contact 51, wire 52, wire 53, wire 54, and return by wire 55 to the secondary coil 31 of transformer 29. With zone No. 1 calling for a forced circulation of the cooling medium, the duct damper circuit that is energized actuates controller 68 to close duct damper 66 of zone No. 2. It is assumed, of course, that at this time the thermostat 28 of zone No. 2 will be satisfied and engaging its cold contact. Accordingly, current will flow from wire 88 through wire 53, wire 52 to contact 51, across the bridging element of the summer and winter switch 80 to contact 81, across to contact 75, through wire 73, the hot contact 71 of thermostat 27, the thermostatic element thereof to wire 47 to wire 56, through thermostat 28 to its cold contact 57, wire 58 to contact 59, across to contact 85, through the bridging element of switch 80 to contact 86, wire 96 through actuating coil 95 of duct damper controller 68 and return by wire 94 to the secondary winding 89 of transformer 90. When relay 23 is energized, the circuit of blower 6 will be substantially the same as described in connection with Figure 9. It will be observed, however, that until either one of thermostats 27 and 28 is energized to call for a forced circulation of the cooling medium, neither circuit of the controllers 67 and 68 is energized. Dampers 65 and 66 are, therefore, normally open to allow a natural circulation of the cooling medium to the zones. When thermostat 27 of zone No. 1 calls for a forced circulation of the cooling medium, it energizes the circuit of controller 68 to close damper 66 controlling the flow of the cooling medium to zone No. 2 so that a forced circulation of the cooling medium to this zone No. 2 will not occur while the cooling medium is being forced to zone No. 1.

Figures 13 and 14 illustrate the summer condition when zone No. 2 calls for a forced circulation of the cooling medium thereto. The blower relay circuit is substantially the same as described in connection with Figure 11 when zone No. 1 calls for a forced circulation of the cooling medium thereto. The current will flow through hot contact 72 of thermostat 28 instead of its cold contact 57, the path of the current being traced from the secondary winding 31 of transformer 29, wire 37, coil 38 of relay 23 through wire 39 and wire 40 to contact 87, across to contact 46 and through wires 47 and 56, through thermostat 28 to its hot contact 72, wire 74 to contact 76, across to contact 84 through the bridging element of switch 80 to contact 60, wires 53 and 54, and return by wire 55 to this secondary coil 31. As shown in Fig. 13, the duct damper circuit includes secondary winding 89 of transformer 90, wire 88, wire 53, contact 60 across the bridging element of switch 80 to contact 84, contact 76, wire 74, hot contact 72 and through thermostat 28, wire 56, wire 47 through thermostat 27 to its cold contact 48, wire 49 to contact 50, and across to contact 82, through the bridging element of switch 80 to contact 83, through wire 93 to actuating coil 92 of controller 67, whereby to actuate this controller, and return by wire 91 to this secondary winding 89.

Figure 15 illustrates the circuit condition when both zones Nos. 1 and 2 call for forced circulation of the cooling medium. As previously mentioned, both duct dampers 65 and 66 are normally open when the zones are satisfied. When both zones call for a forced circulation of the cooling medium because their predetermined temperatures have increased to a point requiring further ventilation or cooling of the room by a forced draft of blower 6, only the blower relay circuit is energized by the simultaneous operations of both the zone thermostats, the circuits to the duct damper controllers remaining the same because these duct dampers are open. Briefly, the flow of current through the blower relay circuit, when both zones Nos. 1 and 2 are calling for forced circulation of the cooling medium in the summer, may be traced from secondary winding 31 of transformer 29 through wire 37, coil 38 of relay 23, wire 39, wire 40 to contact 87, across to contact 46, to wire 47. The current will then flow to wire 56 of thermostat 28 and also continue to thermostat 27. In the case of thermostat 27, it will flow through hot contact 71, wire 73, to contact 75, across to contact 81, through the bridging element of switch 80 to contact 51 and through wire 52 to the common return wire 53. With respect to the current flowing through thermostat 28, the current will flow through wire 56, the thermostatic element to hot contact 72, wire 74 to contact 76, and across to contact 84, through the bridging element of switch 80 to contact 60, and from there to the common return wire 53. The circuit will continue from wire 53 to wire 54 and return by wire 55 to this secondary coil 31.

The invention disclosed herein may be adapted to different types of heating systems, as previously mentioned. To illustrate the general application of the principle herein disclosed, Figure 16 diagrammatically illustrates a hot water, steam or vapor system having a furnace 100, draft and check dampers 101 and 102, respectively, with flexible connections 103 and 104 leading to a furnace controller, which may be of the type shown in Fig. 1, if so desired. Suitable connections in the form of header pipes 105 and 106 are shown leading from the dome of furnace 100. Header pipe 105 may lead to a suitable heat radiating member such as a radiator 107 located in zone No. 1. Header pipe 106 may be connected in the same manner to a similar heat radiating member in zone No. 2. Instead of providing the type of duct damper shown in Figure 1, a valve 108 may be inserted in each of these header pipes and controlled by auxiliary controllers 67 and 68, respectively, which may be similar to those heretofore described, both in structure and operation, or they may be of any suitable construction. Instead of providing a damper arm 69, a connection 109 between the controllers and the valves may be provided so that the valves may remain normally open and actuated to closed position when the auxiliary controllers are energized.

Without further elaboration, the foregoing will so fully explain the gist of my invention, that others may, by applying current knowledge, readily adopt the same for use under varying conditions of service, without eliminating certain features, which may properly be said to constitute the essential items of novelty involved, which items are intended to be defined and secured to me by the following claims.

I claim:

1. In a multi-zone furnace control, the combination of means for supplying a heat conducting medium to a plurality of zones to be heated, means for controlling the rate of supply of said heat conducting medium, thermostatic apparatus responsive to furnace temperature, thermostatic apparatus responsive to zone temperature, said furnace thermostatic apparatus controlling the operation of said control means, said zone thermostatic apparatus controlling the operation of said supply means and said control means, said supply means operating at a predetermined low furnace temperature and a predetermined high zone temperature to provide a gravity circulation of said heat conducting medium to said zones, said zone thermostatic apparatus actuating said supply means to discontinue said gravity circulation of said heat conducting medium to certain of said zones remaining at said predetermined high zone temperature when other of said zones are at a lower temperature, said control means supplying said heat conducting medium at an accelerated rate to said other of said zones when at said lower temperature.

2. In a multi-zone furnace control, the combination of means for supplying a heat conducting medium to a plurality of zones to be heated, means for controlling the rate of supply of said heat conducting medium, thermostatic apparatus responsive to furnace temperature, thermostatic apparatus responsive to zone temperature, said furnace thermostatic apparatus controlling the operation of said control means, said zone thermostatic apparatus controlling the operation of said supply means and said control means, said supply means operating at a predetermined low furnace temperature and a predetermined high zone temperature to provide a gravity circulation of said heat conducting medium to said zones, said zone thermostatic apparatus actuating said supply means to discontinue said gravity circulation of said heat conducting medium to certain of said zones remaining at said predetermined high zone temperature when other of said zones are at a lower temperature, said control means supplying said heat conducting medium at an accelerated rate to said other of said zones when at said lower temperature, said control means continuing to supply said heat conducting medium at an accelerated rate irrespective of the temperature conditions of said zones when the furnace temperature exceeds a predetermined degree.

3. In a multi-zone regulating system, the combination of a plurality of valve controlling devices, each to control the flow of a heat transfer medium to a zone, and a thermostat in each zone responsive to the temperature conditions thereof, and connections between said valve devices and said thermostats by means of which said valve devices are held in open position when said thermostats are satisfied but in closed position when any one of said thermostats calls for said heat transfer medium, the thermostat calling for said heat transfer medium maintaining the valve device of its zone in open position.

4. In a multi-zone regulating system, the combination of a plurality of ducts for supplying a heat transfer medium to a plurality of individually controlled zones by gravity circulation, a circulator for accelerating the rate of flow of said heat transfer medium, dampers in said ducts, actuating means for opening and closing said dampers, and a thermostat in each zone for controlling said dampers actuating means, all of said dampers remaining in open position when said thermostats are satisfied to provide a gravity circulation of said heat transfer medium to said zones, all of said dampers remaining in open position when said thermostats call for said heat transfer medium to provide the latter at an accelerated rate to said zones, either or both of said dampers being closed by said thermostats when the temperature of the corresponding zone or zones rises above a predetermined value.

5. In a multi-zone furnace control, the combination of means for supplying a heat conducting medium to a plurality of zones to be heated, means for controlling the rate of supply of said heat conducting medium, a thermostat in each zone responsive to the temperature thereof, and electrical circuit connections between said control means and said thermostat including electrically controlled valve means for each zone for controlling the flow of said heat conducting medium thereto, said circuit connections effecting the energization of said valve means to discontinue the flow of said heat conducting medium to a zone while above a predetermined temperature when the thermostat of another zone is influenced by a predetermined drop of temperature in said other zone, the actuation of either thermostat by said predetermined temperature drop of its zone effecting energization of said control means to provide an accelerated supply of said heat conducting medium.

6. A multi-zone furnace control comprising, in combination, means for supplying a fluid medium to a plurality of heated zones, a circulator for accelerating the circulation of said fluid medium, means for intercepting the flow of the fluid medium to either zone, and thermostats for said zones influenced by temperature changes therein for controlling said intercepting means and said circulator, the thermostat of either zone energizing said circulator to supply said fluid medium at an accelerated rate to its zone when the temperature thereof drops below a predetermined value and to energize said intercepting means to discontinue the flow of the fluid medium to the other zone.

7. In combination, a heater for heating a fluid medium delivered to a plurality of zones, electrical means in control of said heater, zone thermostats in control of said heater controlling means to increase the heating of the fluid medium when the temperature of one of the zones becomes too low, electrical means to circulate the fluid medium at an accelerated rate, said circulating means being actuated by the thermostat of the zone calling for heat, and means energized by said thermostat of the zone calling for heat for intercepting the accelerated flow of said fluid medium to the other zone.

8. In combination, a heater for heating a fluid medium delivered to a plurality of zones by gravity circulation when the temperature of the zones is above a predetermined value, electrical means in control of said heater, a thermostat in each zone in control of said heater controlling means to increase the heating of the fluid medium when the temperature of one of the zones becomes too low, electrical means to circulate the fluid medium at an accelerated rate, said circulating means being actuated by the thermostat of the zone calling for heat, and means energized ! said thermostat of the zone calling for heat for intercepting the flow of the fluid medium to the other zone.

9. In combination, a heater for heating a fluid medium delivered to a plurality of zones by gravity circulation when the temperature of the zones is above a predetermined value, electrical means in control of said heater, a thermostat in each zone in control of said heater controlling means to increase the heating of the fluid medium when the temperature of one or all of said zones becomes too low, electrical means to circulate the fluid medium at an accelerated rate, said circulating means being actuable by the thermostat of one or all said zones when the temperature thereof becomes too low, and means energ'zable by either of the thermostats when its zone calls for heat for intercepting the flow of the f medium to the other zone when the temperature thereof remains above said predetermined v l said intercepting means remaining de-energized if the temperature of all zones becomes too low.

10. In combination, a heater for heating a fluid medium delivered to a plurality of zones by gravity circulation when the temperature of the zone is above a predetermined value, electrical means to circulate the fluid medium at an accelerated rate, a thermostat in each zone in control of said circulating means to circulate the fluid medium at an accelerated rate when the temperature of one of the zones becomes too low, and means energized by the thermostat of the zone calling for heat for intercepting the flow of the fluid medium to the other zone.

11. In combination, a heater for heating a fluid medium delivered to a plurality of zones by gravity circulation when the temperature of the zones is above a predetermined value, a thermostat in each zone, heat-regulating means controlled by said thermostats and by the temperature of the fluid medium for increasing the heat supplied to said fluid medium when the temperature of one or all said zones drops below said predetermined value and when the temperature of the f medium is below a predetermined value, a circulator for accelerating the circulation of said fluid medium, a fluid medium responsive thermostat for controlling said circulator, and means controlled by said zone thermostats for intercepting the flow of the fluid medium to any zone the temperature of which is above said predetermined value when the temperature of another zone drops below said predetermined value.

12. In combination, a heater for heating a fluid medium delivered to a plurality of zones by gravity circulation when the temperature of the zones is above a predetermined value, a thermostat in each zone, thermostatic means responsive to the temperature of said fluid medium, a circulator for accelerating the circulation of said fluid medium, said circulator being controlled by said fluid medium thermostatic means and by said zone thermostats, and means controlled by said zone thermostats for intercepting the flow of the fluid medium to any zone the temperature of which is above said predetermined value when the temperature of another zone drops below said predetermined value.

13. In combination, a heater for heating a fluid medium delivered to a plurality of zones by gravity circulation when the temperature of the zones is above a predetermined value, a thermostat in each zone, thermostatic means responsive to the temperature of said fluid medium, a circulator for accelerating the circulation of said fluid medium, said circulator being controlled by said fluid medium thermostatic means and by said zone thermostats to prevent its energization when one of the zone thermostats is actuated by a drop of temperature below said predetermined value when the temperature of said fluid medium is too low, means in the control of said zone thermostats for intercepting the flow of the fluid medium to any zone the temperature of which is above said predetermined value when the temperature of another zone drops below said predetermined value, and means for energizing said circulator independently of the actuation of said zone thermostats when the temperature of said fluid medium becomes too high.

14. In combination, means for supplying a fluid medium to a plurality of zones at a predetermined rate, a circulator for accelerating the rate of circulation of said fluid medium, means for intercepting the flow of said fluid medium at said accelerated rate to either zone, and thermostats in said zones influenced by temperature changes therein for controlling said intercepting means and said circulator, the thermostat of either zone energizing said circulator to supply said fluid medium at an accelerated rate to its zone upon a predetermined temperature change therein and to energize said intercepting means to discontinue the flow of said fluid medium to the other zone.

15. In combination, means for supplying a fluid medium to a plurality of zones at a predetermined rate, a circulator for accelerating the rate of circulation of said fluid medium, heat producing means including heat-regulating means for said fluid medium, a thermostat in each zone influenced by temperature changes therein for controlling said heat-regulating means and said circulator, means for intercepting the flow of said fluid medium at said accelerated rate to either zone, said intercepting means being controlled by said thermostats.

16. In combination, means for supplying a fluid medium to a plurality of zones at a predetermined rate, a circulator for accelerating the rate of circulation of said fluid medium, heat producing means including heat-regulating means for said fluid medium, a thermostat in each zone influenced by temperature changes therein for controlling said heat-regulating means and said circulator, means for intercepting the flow of said fluid medium at said accelerated rate to either zone, said intercepting means being controlled by said thermostats, and a temperature control influenced by the temperature of said fluid medium for delaying the operation of said circulator until the temperature of said heating medium is above a predetermined value.

17. In combination, means for supplying a fluid medium to a plurality of zones at a given rate, heat producing means including heat regulating means for increasing the heat supplied to said fluid medium to raise the temperature thereof, a thermostat for each zone influenced by temperature changes for controlling said heat regulating means, and means controlled by said thermostats for intercepting the flow of said fluid medium to any zone the temperature of which is above a predetermined value when the temperature of another zone drops below a predetermined value, said heat-regulating means being operative to raise the temperature of said fluid medium when said thermostat energizes said intercepting means.

18. In combination, means for supplying a fluid medium to a plurality of zones at a given rate, heat-producing means including heat-regulating means for increasing the heat supplied to said fluid medium to raise the temperature thereof, a thermostat for each zone influenced by temperature changes for controlling said heat-regulating means, thermostatic means responsive to the temperature of said fluid medium to control said heat-regulating means to prevent operation of said heat-regulating means when the temperature of said fluid medium is above a predetermined value, and means controlled by said thermostats for intercepting the flow of said fluid medium to any zone the temperature of which is above a predetermined value when the temperature of another zone drops below a predetermined value.

19. In combination, means for supplying a fluid medium to a plurality of zones at a given rate, a circulator for accelerating the rate of circulation of said fluid medium, a thermostat for each zone influenced by temperature changes therein for controlling said circulator, and means controlled by said thermostats for intercepting the flow of said fluid medium at an accelerated rate to any zone the temperature of which is above a predetermined value when the temperature of another zone drops below a predetermined value.

JOHN S. BAKER.